(12) United States Patent
Kim et al.

(10) Patent No.: US 12,374,704 B2
(45) Date of Patent: Jul. 29, 2025

(54) AIR-COOLING TYPE FUEL CELL CAPABLE OF AIR RECIRCULATION

(71) Applicant: TERRALIX CO., LTD., Buan-gun (KR)

(72) Inventors: Dae Sung Kim, Buan-gun (KR); Myeong Lee Kim, Jeonju-si (KR)

(73) Assignee: TERRALIX CO., LTD., Buan-gun (KR)

( * ) Notice: Subject to any disclaimer, the term of this patent is extended or adjusted under 35 U.S.C. 154(b) by 0 days.

(21) Appl. No.: 17/924,974

(22) PCT Filed: Jul. 18, 2022

(86) PCT No.: PCT/KR2022/010462
§ 371 (c)(1),
(2) Date: Nov. 11, 2022

(87) PCT Pub. No.: WO2023/158032
PCT Pub. Date: Aug. 24, 2023

(65) Prior Publication Data
US 2024/0222660 A1 Jul. 4, 2024

(30) Foreign Application Priority Data
Feb. 17, 2022 (KR) .................. 10-2022-0020632

(51) Int. Cl.
*H01M 8/04* (2016.01)
*H01M 8/04014* (2016.01)
*H01M 8/0432* (2016.01)
*H01M 8/04746* (2016.01)

(52) U.S. Cl.
CPC ... *H01M 8/04014* (2013.01); *H01M 8/04358* (2013.01); *H01M 8/04768* (2013.01)

(58) Field of Classification Search
CPC ......... H01M 8/04014; H01M 8/04358; H01M 8/04768
See application file for complete search history.

(56) References Cited

U.S. PATENT DOCUMENTS

2012/0214077 A1* 8/2012 Garrettson ........ H01M 8/04228
429/429
2016/0276682 A1* 9/2016 Yamamoto .............. B60L 58/30

FOREIGN PATENT DOCUMENTS

KR 10-2017-0077897 A 7/2017

* cited by examiner

*Primary Examiner* — Olatunji A Godo
(74) *Attorney, Agent, or Firm* — Goldilocks Zone IP Law

(57) ABSTRACT

Proposed is an air-cooling type fuel cell. More particularly, proposed is an air-cooling type fuel cell capable of air recirculation, in which air passing through a stack is circulated back toward an inlet of a housing to be used as cooling air for the stack, thereby preventing overcooling of the stack even at a low outside air temperature and maintaining the stack at an appropriate temperature; air is circulated along opposite sides of the housing to insulate opposite ends of the stack, thereby maintaining the entire stack at a uniform temperature; and the degree of circulation of air passing through the stack is adjusted, thereby accurately adjusting the temperature of air supplied to the stack.

5 Claims, 11 Drawing Sheets

(a)

(b)

[FIG. 1]
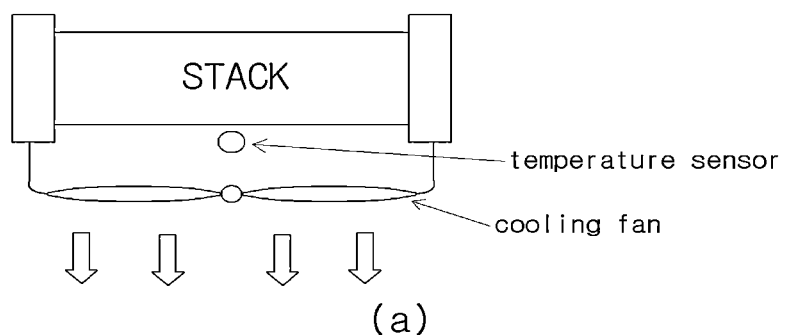
(a)
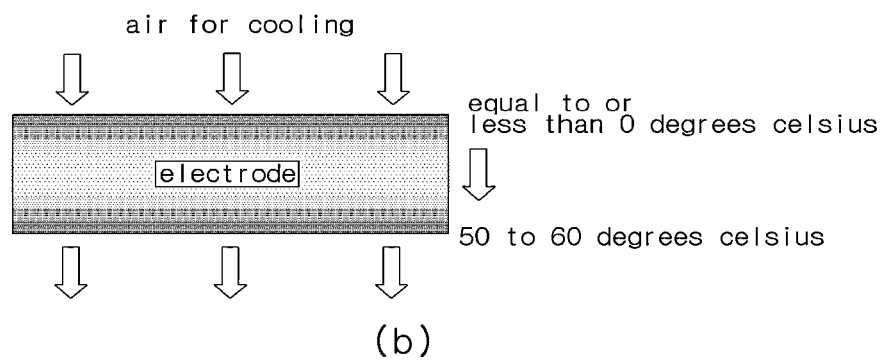
(b)

[FIG. 2]
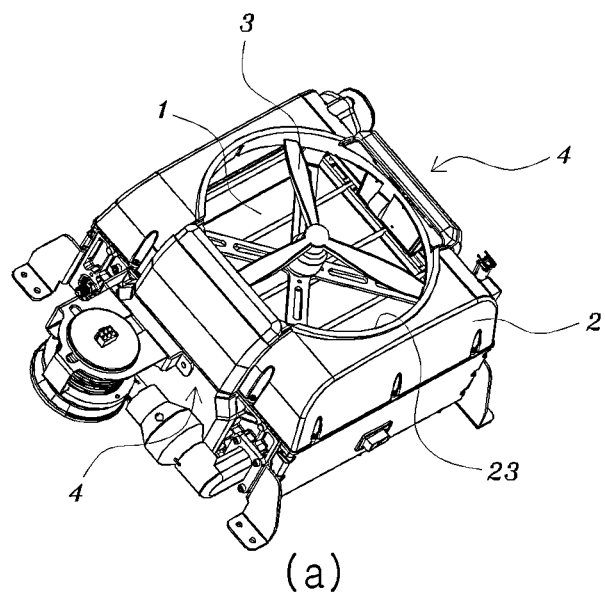
(a)
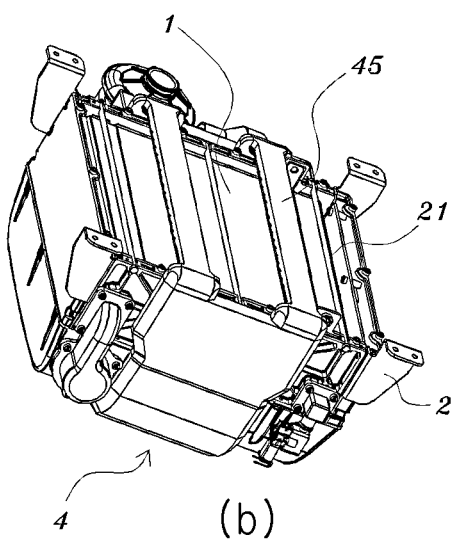
(b)

[FIG. 3]
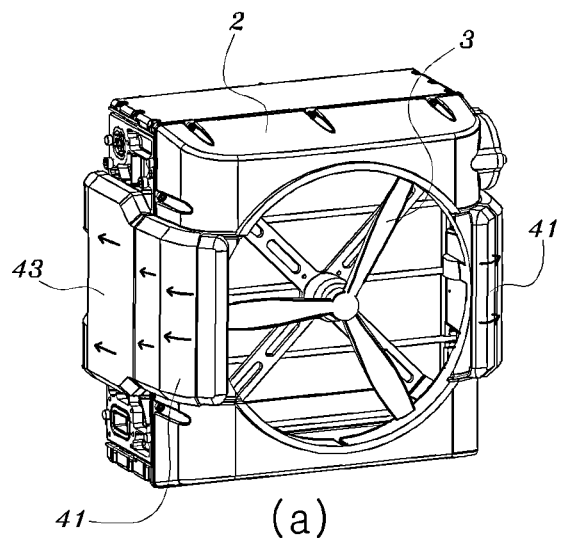
(a)
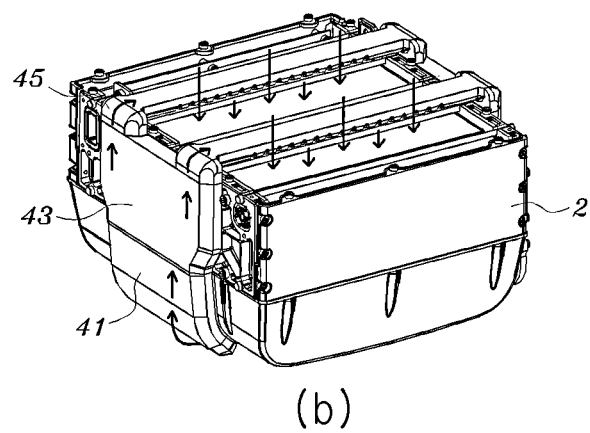
(b)

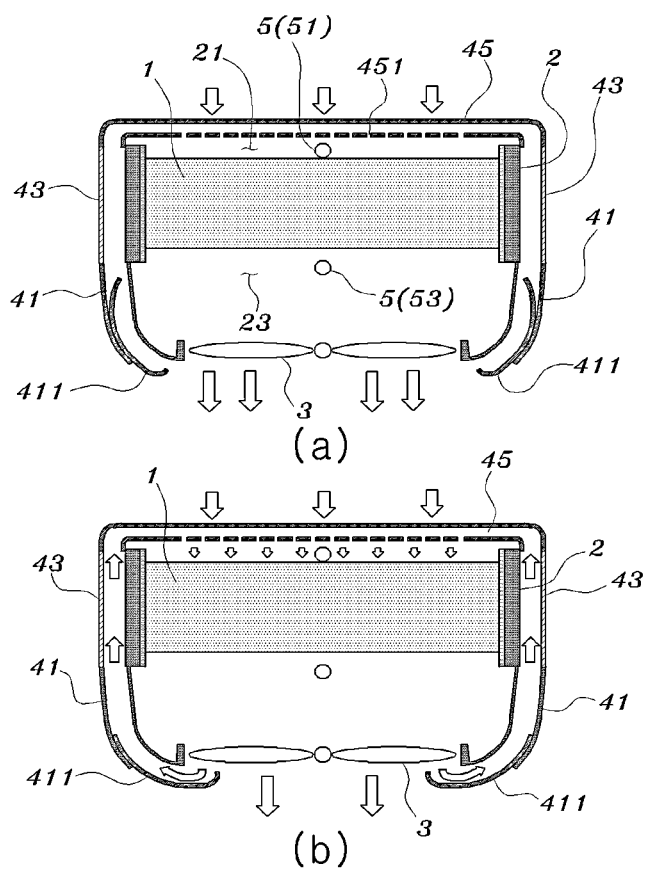
[FIG. 4]

[FIG. 5]
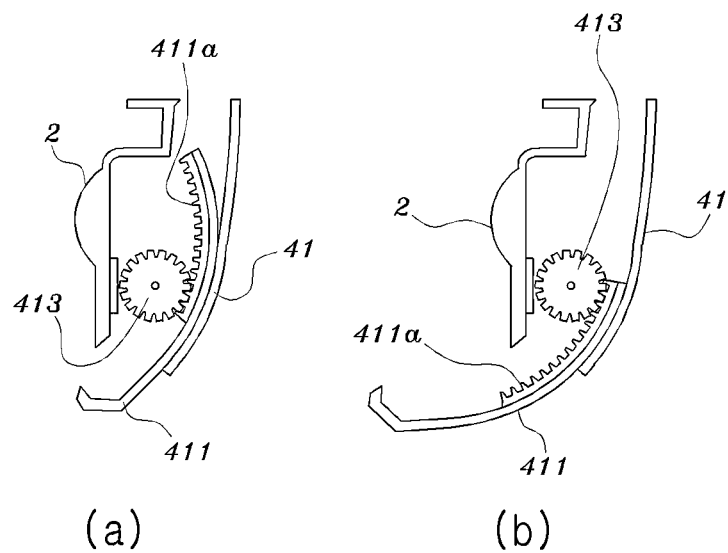
(a)　　　　　(b)

[FIG. 6]
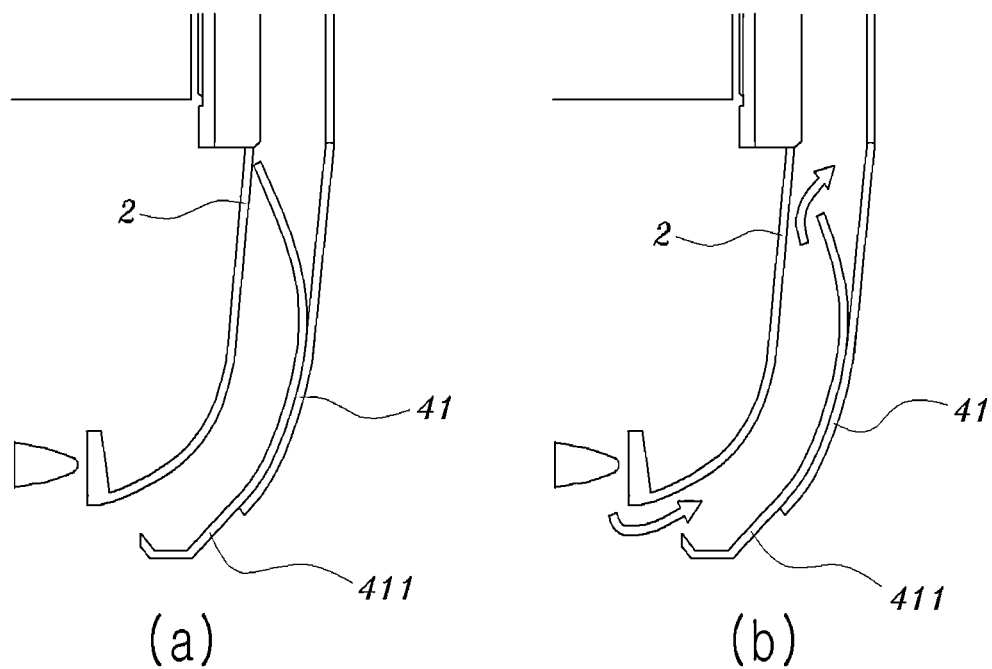

[FIG. 7]
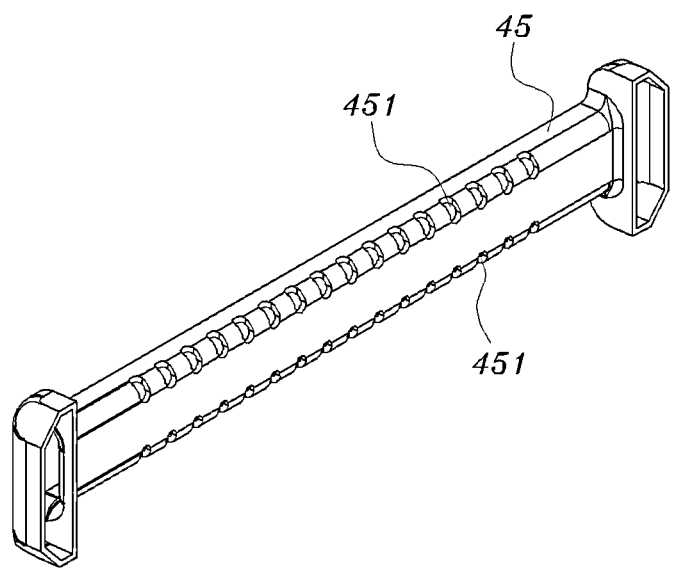

[FIG. 8]
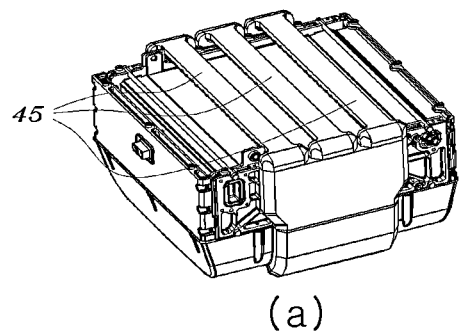
(a)
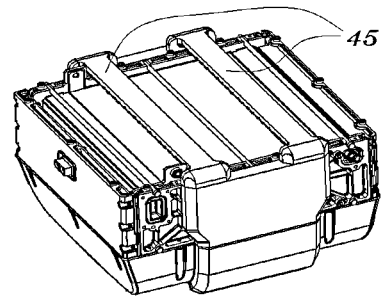
(b)
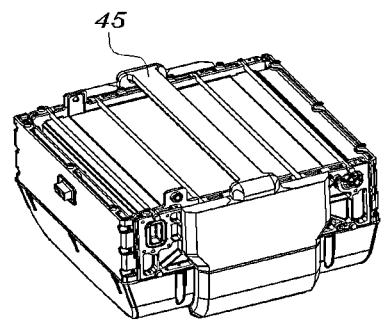
(c)

[FIG. 9]
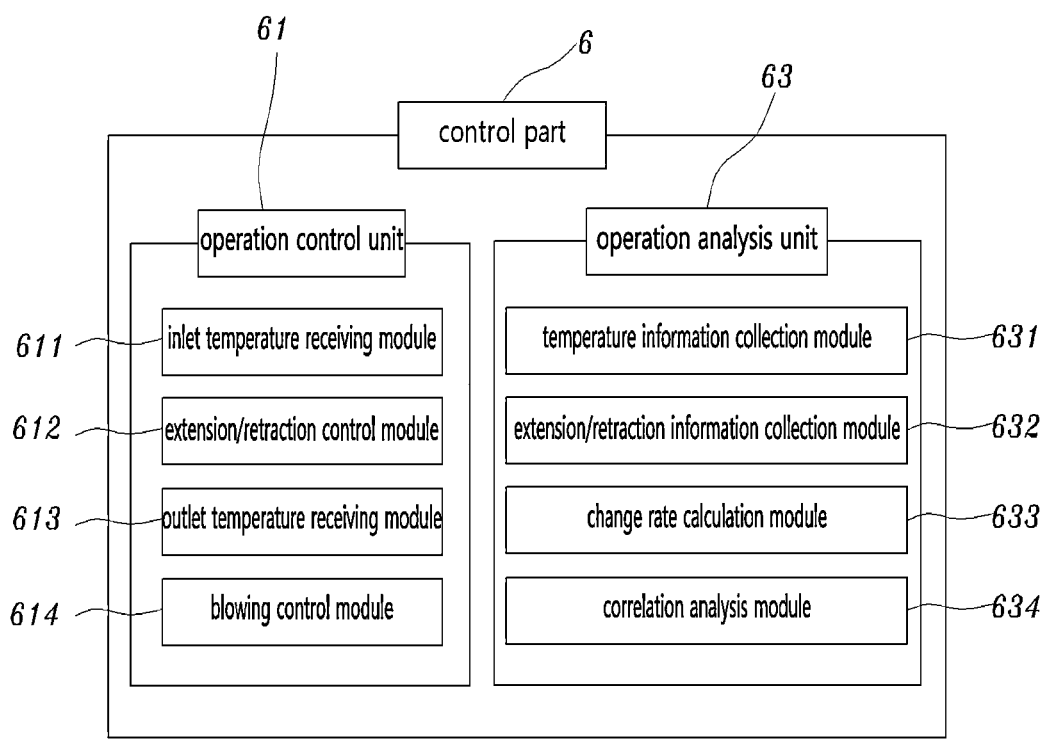

[FIG. 10]
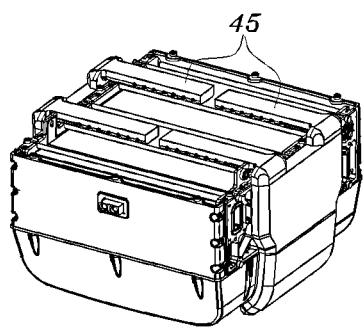
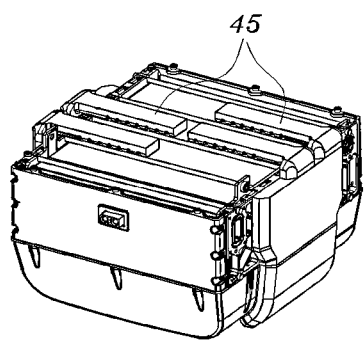
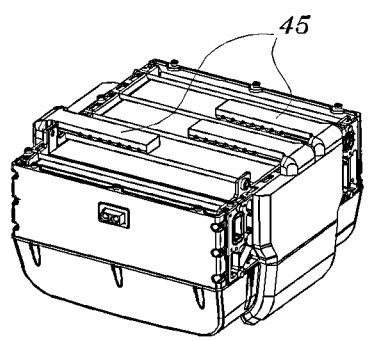

[FIG. 11]
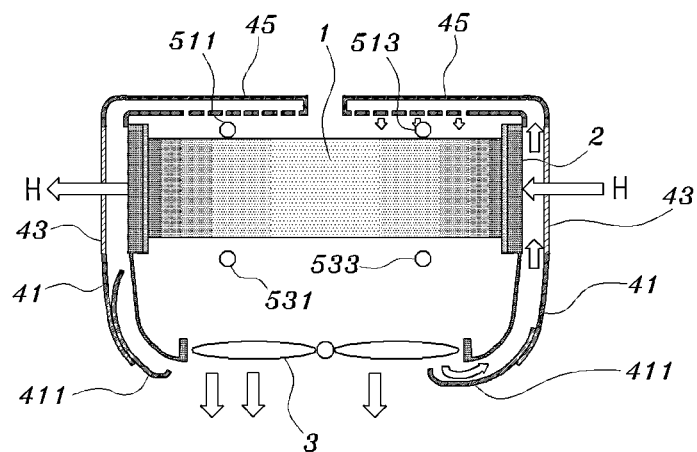

AIR-COOLING TYPE FUEL CELL CAPABLE OF AIR RECIRCULATION

CROSS-REFERENCE TO RELATED APPLICATIONS

This application claims the benefit under 35 U.S.C. section 371, of PCT International Application No. PCT/KR2022/010462, filed on Jul. 18, 2022, which claims priority to Korean Patent Application No. 10-2022-0020632, filed on Feb. 17, 2022, in the Korean Intellectual Property Office, both of which are hereby incorporated by reference in their entireties.

TECHNICAL FIELD

The present disclosure relates generally to an air-cooling type fuel cell. More particularly, the present disclosure relates to an air-cooling type fuel cell capable of air recirculation, in which air passing through a stack is circulated back toward an inlet of a housing to be used as cooling air for the stack, thereby preventing overcooling of the stack even at a low outside air temperature and maintaining the stack at an appropriate temperature; air is circulated along opposite sides of the housing to insulate opposite ends of the stack, thereby maintaining the entire stack at a uniform temperature; and the degree of circulation of air passing through the stack is adjusted, thereby accurately adjusting the temperature of air supplied to the stack.

BACKGROUND ART

A fuel cell is a type of power generator that converts chemical energy of fuel into electric energy through an electrochemical reaction. Fuel cells have a wide range of applications, including serving as industrial power generators, serving as household power generators, powering vehicles, and powering small electronic devices such as portable devices.

There are several types of fuel cells, but polymer electrolyte membrane fuel cells (PEMFCs) with high power density as disclosed in the following patent document are mainly used. In a PEMFC, a membrane electrode assembly (MEA) is located at the innermost portion of the cell. The MEA includes a polymer electrolyte membrane (PEM) for allowing transport of positively charged hydrogen ions (protons) therethrough, and catalyst layers, i.e., a cathode and an anode, applied on opposite surfaces of the PEM to cause hydrogen and oxygen to react. Hydrogen is supplied to the anode while air is supplied to the cathode, and electricity is generated through the reaction between oxygen contained in the air and hydrogen.

In addition, since a lot of heat is generated by the reaction in the fuel cell, it is necessary to supply a fluid for cooling.

Fuel cells may be divided into a water-cooling type and an air-cooling type depending on cooling methods. In order to simplify the configuration of an apparatus and to reduce the size and weight of the apparatus, the air-cooling type which is cooled by air is mainly used. In a typical air-cooling type fuel cell, as disclosed in the following patent document, air for reaction and air for cooling are supplied to the fuel cell together through a blowing module or the like.

To cool the air-cooling type fuel cell, as illustrated in FIG. 1, outside air is circulated by a blowing fan 100 to be supplied to the fuel cell. Thus, the cooling performance of the fuel cell is inevitably dependent on the temperature of outside air.

Therefore, in summer, when the temperature of outside air is 20 to 40 degrees Celsius, the operating temperature of the fuel cell can be maintained at an appropriate temperature of 50 to 60 degrees Celsius only by the operation of the blowing fan, but in winter, when the temperature of outside air drops below 0 degrees Celsius, the operating temperature of the fuel cell is difficult to maintain at 50 to 60 degrees Celsius.

As a result, in winter, air below 0 degrees Celsius flows into the fuel cell, causing excessive cooling of the fuel cell and thereby leading to flooding caused by excessive water condensate. This degrades the performance of the fuel cell and sometimes causes permanent damage to the fuel cell as cooling air freezes.

(Patent Document) Korean Patent Application Publication No. 10-2017-0077897 (published on Jul. 7, 2017) "Fuel cell stack having open flow passage"

DISCLOSURE

Technical Problem

Accordingly, the present disclosure has been made keeping in mind the above problems occurring in the related art.

An objective of the present disclosure is to provide an air-cooling type fuel cell that circulates air passing through a stack back toward an inlet of a housing to be used as cooling air for the stack, thereby preventing overcooling of the stack and maintaining the stack at an appropriate temperature even at a low outside air temperature.

Another objective of the present disclosure is to provide an air-cooling type fuel cell that circulates air along opposite sides of a housing to insulate opposite ends of a stack, thereby maintaining the entire stack at a uniform temperature.

Still another objective of the present disclosure is to provide an air-cooling type fuel cell that adjusts the degree of circulation of air passing through a stack, thereby accurately adjusting the temperature of air supplied to the stack.

Yet another objective of the present disclosure is to provide an air-cooling type fuel cell that adjusts the degree of extension of an extendable/retractable member by analyzing a correlation between the degree of extension of the extendable/retractable member and the change in air temperature at an inlet so that air of an appropriate temperature is supplied to a stack, thereby improving accuracy of maintaining an appropriate temperature of the stack.

Still yet another objective of the present disclosure is to provide an air-cooling type fuel cell, in which an air circulation part is configured to be provided at each of opposite sides of a housing, and the degree of air circulation of the respective air circulation parts is adjusted according to the temperatures at an inlet and an outlet of the housing, thereby maintaining the entire stack at a uniform temperature.

Technical Solution

The present disclosure is implemented by embodiments having the following configuration in order to achieve the above objectives.

According to one embodiment of the present disclosure, there is provided an air-cooling type fuel cell including: a stack formed by stacking a plurality of unit cells; a housing accommodating and surrounding the stack therein; a blowing fan provided at a side of the housing and configured to circulate outside air to pass through the stack; and an air circulation part configured to recirculate air passing through the stack by the blowing fan toward an inlet of the stack.

According to another embodiment of the present disclosure, in the air-cooling type fuel cell according to the present disclosure, the air circulation part may include: an inlet duct provided at a position where an outlet of the housing that is configured to allow air passing through the stack to be discharged therethrough is provided, and configured to introduce a part of the discharged air; a circulation duct configured to circulate the air introduced into the inlet duct toward an inlet of the housing that is configured to allow air to be introduced into the stack; and an outlet duct connected to the circulation duct, provided on the inlet, and configured to supply the air passing through the circulation duct to the stack.

According to still another embodiment of the present disclosure, in the air-cooling type fuel cell according to the present disclosure, the inlet duct may include an extendable/retractable member protruding toward the outlet inside the inlet duct, and an actuating gear configured to extend and retract the extendable/retractable member.

According to yet another embodiment of the present disclosure, the air-cooling type fuel cell according to the present disclosure may further include an operation control part configured to control an operation of the fuel cell, wherein the operation control part may include an inlet temperature receiving module configured to receive temperature information about a temperature at the inlet of the housing, and an extension/retraction control module configured to adjust a degree of extension of the extendable/retractable member according to the temperature at the inlet.

According to still yet another embodiment of the present disclosure, the air-cooling type fuel cell according to the present disclosure may further include an operation analysis part configured to analyze a correlation between the degree of extension of the extendable/retractable member and a change in the temperature at the inlet, wherein the operation analysis part may include: a temperature information collection module configured to collect the temperature information about the inlet; an extension/retraction information collection module configured to collect information about an operation of the extendable/retractable member; a change rate calculation module configured to calculate a degree of change in the temperature at the inlet before and after the extendable/retractable member is operated; and a correlation analysis module configured to analyze a correlation between the degree of extension of the extendable/retractable member and the degree of change in the temperature, and the extension/retraction control module may adjust the degree of extension of the extendable/retractable member using the correlation analyzed by the correlation analysis module.

According to still yet another embodiment of the present disclosure, in the air-cooling type fuel cell according to the present disclosure, the outlet duct may be provided at each of opposite sides of the inlet, the inlet duct may be provided at each of opposite sides of the outlet so as to be connected to each of the respective outlet ducts, and the operation control part may measure a temperature at each of opposite sides of each of the inlet and the outlet to adjust the degree of extension of the extendable/retractable member of the inlet duct connected to each of the outlet ducts.

According to still yet another embodiment of the present disclosure, in the air-cooling type fuel cell according to the present disclosure, the outlet duct may include a plurality of discharge holes formed at regular intervals along a direction of the stack and configured to allow air to be supplied therethrough.

According to still yet another embodiment of the present disclosure, in the air-cooling type fuel cell according to the present disclosure, the outlet duct may include a plurality of outlet ducts provided according to a length and an area of the stack.

Advantageous Effects

The present disclosure can achieve the following effects by the above embodiments, and the configuration, combination, and use relationship described below.

Air passing through a stack is circulated back toward an inlet of a housing to be used as cooling air for the stack, thereby preventing overcooling of the stack and maintaining the stack at an appropriate temperature even at a low outside air temperature.

Air is circulated along opposite sides of the housing to insulate opposite ends of the stack, thereby maintaining the entire stack at a uniform temperature.

The degree of circulation of air passing through the stack is adjusted, thereby accurately adjusting the temperature of air supplied to the stack.

The degree of extension of an extendable/retractable member is adjusted by analyzing a correlation between the degree of extension of the extendable/retractable member and the change in air temperature at the inlet so that air of an appropriate temperature is supplied to a stack, thereby improving accuracy of maintaining an appropriate temperature of the stack.

An air circulation part is configured to be provided at each of opposite sides of the housing, and the degree of air circulation of the respective air circulation parts is adjusted according to the temperatures at the inlet and an outlet of the housing, thereby maintaining the entire stack at a uniform temperature.

DESCRIPTION OF DRAWINGS

FIG. 1 is a reference view illustrating a cooling process of a conventional air-cooling type fuel cell.

FIG. 2 is a perspective view illustrating an air-cooling type fuel cell according to an embodiment of the present disclosure.

FIG. 3 is a reference view illustrating an air circulation process of the air-cooling type fuel cell according to the embodiment of the present disclosure.

FIG. 4 is a sectional view of FIG. 3.

FIG. 5 is an enlarged sectional view illustrating an inlet duct.

FIG. 6 is a sectional view illustrating various embodiments of an extendable/retractable member.

FIG. 7 is a perspective view illustrating an outlet duct.

FIG. 8 is a reference view showing various embodiments of the outlet duct.

FIG. 9 is a block diagram illustrating the configuration of a control part.

FIG. 10 is a perspective view illustrating an air-cooling type fuel cell according to another embodiment of the present disclosure.

FIG. 11 is a reference view illustrating an operation example of the air-cooling type fuel cell illustrated in FIG. 10.

DESCRIPTION OF THE REFERENCE NUMERALS IN THE DRAWINGS

| | | |
|---|---|---|
| 1: stack | 2: housing | 21: inlet |
| 23: outlet | 3: blowing fan | |
| 4: air circulation part | | |
| 41: inlet duct | | |
| 411: extendable/retractable member | | |
| 411a: gear teeth | | |
| 413: actuating gear | 43: circulation duct | |
| 45: outlet duct | | |
| 451: discharge hole | 5: temperature sensing part | |
| 51: inlet sensor | | |
| 511: first inlet sensor | | |
| 513: second inlet sensor | 53: outlet sensor | |
| 531: first outlet sensor | | |
| 533: second outlet sensor | 6: control part | |
| 61: operation control unit | | |
| 611: inlet temperature receiving module | | |
| 612: extension/retraction control module | | |
| 613: outlet temperature receiving module | | |
| 614: blowing control module | | |
| 63: operation analysis unit | | |
| 631: temperature information collection module | | |
| 632: extension/retraction information collection module | | |
| 633: change rate calculation module | | |
| 634: correlation analysis module | H: fuel | |

BEST MODE

Hereinafter, exemplary embodiments of an air-cooling type fuel cell capable of air recirculation according to the present disclosure will be described in detail with reference to the accompanying drawings. In the following description of the present disclosure, detailed descriptions of known functions and components incorporated herein will be omitted when it may make the subject matter of the present disclosure unclear. Unless the context clearly indicates otherwise, it will be further understood that the terms "comprise", "include", and/or "have", when used herein, specify the presence of stated features, integers, steps, operations, elements, and/or components, but do not preclude the presence or addition of one or more other features, integers, steps, operations, elements, components, and/or groups thereof. Also, the terms "~ part", "~ unit", "~ module", and the like mean a unit for processing at least one function or operation and may be implemented by a combination of hardware and/or software.

An air-cooling type fuel cell capable of air recirculation according to an embodiment of the present disclosure will be described with reference to Referring to FIGS. 2 to 9. The air-cooling type fuel cell includes a stack 1 formed by stacking a plurality of unit cells; a housing 2 for accommodating and surrounding the stack 1 therein; a blowing fan 3 formed at a side of the housing 2 to circulate outside air to pass through the stack 1; an air circulation part for recirculating air passing through the stack 1 by the blowing fan 3 toward an inlet of the stack 1; a temperature sensing part 5 for measuring the temperature in the fuel cell; and a control part 6 for controlling the operation of the fuel cell.

As described in the background art, in the case of a conventional air-cooling type fuel cell, there is a problem in that the fuel cell is overcooled as the temperature of outside air is lowered. Accordingly, the present disclosure prevents overcooling of the fuel cell even when the outside air temperature is low by enabling high-temperature air discharged after cooling the fuel cell to be recirculated for use in cooling the fuel cell. In addition, the present disclosure adjusts the degree of circulating air discharged from the fuel cell so that air of appropriate temperature is supplied to the fuel cell, thereby enabling the temperature in the fuel cell to be always maintained at an appropriate temperature regardless of the outside air temperature.

The stack 1 is a configuration formed by stacking a plurality of unit cells. In the stack 1, a plurality of electrodes composed of an anode, a cathode, etc. are stacked to generate power. In addition, adjacent stacked cells are separated by a separator, and air is supplied to a space formed by the separator so as to cool heat generated in the stack 1.

The housing 2 is a configuration for accommodating the stack 1, and has an inner space for accommodating the stack 1. In addition, the housing 2 has open spaces at upper and lower sides thereof to allow outside air to be supplied to and discharged from the stack 1 in the housing 2, thereby cooling heat generated in the stack 1. Specifically, the housing 2 may include an inlet 21 open at a first side thereof through which outside air is introduced, and an outlet 23 opened at a second side thereof through which air passing through the stack 1 is discharged to the outside. Preferably, the blowing fan 3 is formed on the outlet 23 to introduce and discharge outside air into and from the stack 1.

The blowing fan 3 is a configuration for introducing and discharging outside air into and from the stack 1, and is preferably formed on the outlet 23. The blowing fan 3 introduces outside air into the stack 1 through the inlet 21 and discharges air passing through the stack 1 to the outside through the outlet 23 according to its operation.

The air circulation part 4 is a configuration for circulating air discharged through the outlet 23 of the housing 2 toward the inlet 21. The air circulation part 4 circulates high-temperature air passing through the stack 1 back to the inlet 21 to be supplied to the stack 1 so that even when the temperature of outside air is low, the temperature is increased to increase the temperature of the stack 1. Thus, the air circulation part 4 prevents overcooling of the stack 1 even when the temperature of outside air is low and maintains the stack 1 at an appropriate temperature so that the stack 1 exhibits optimal performance. In addition, the air circulation part 4 circulates air along opposite sides of the housing 2 to insulate an end plate side of the stack 1 formed at each of opposite sides of the housing 2, so that even when the outside air temperature is low, the temperature of the entire stack 1 is maintained uniformly to ensure optimal performance. To this end, as illustrated in FIG. 3, the air circulation part 4 includes an inlet duct 41, a circulation duct 43, and an outlet duct 45.

The inlet duct 41 is a configuration for introducing air discharged through the outlet 23, and may be formed to be fixed to the housing 2 at each of opposite sides of the outlet 23. The inlet duct 41 forms a space between the housing 2 and the inlet duct 41 to introduce air therein, and is connected to the circulation duct 43 to circulate air toward the inlet 21. In particular, the inlet duct 41 includes an extendable/retractable member 411 protruding toward the outlet 23 to effectively introduce air discharged through the outlet 23. The extendable/retractable member 411 is extended and retracted by the actuating gear 413 to adjust the degree of air circulation.

The extendable/retractable member 411 is a configuration that is extended and retracted inside the inlet duct 41 with respect to the outlet 23. When the retractable member 411 is extended toward the outlet duct 23 as illustrated in FIG. 4(b) in a state retracted into the inlet duct 41 as illustrated in FIG. 4(a), air discharged through the outlet 23 is blocked by the extendable/retractable member 411 to be introduced into the inlet duct 41. At this time, the degree to which the extendable/retractable member 411 is extended toward the outlet 23 is adjusted to adjust the degree of air circulation, so that the temperature of air supplied to the stack 1 is appropriately adjusted. In addition, as illustrated in FIG. 6(a), the extendable/retractable member 411 may be configured such that an end thereof is in contact with the inside of the inlet duct 41 in a state retracted into the inlet duct 41 to prevent unnecessary circulation of air. Alternatively, as illustrated in FIG. 6(b), the extendable/retractable member 411 may be configured such that the end thereof is spaced apart from the inside of the inlet duct 41 by a predetermined distance in a state retracted into the inlet duct 41 so that a portion of discharged air is naturally circulated. The extendable/retractable member 411 is extended from and retracted into the inlet duct 41 according to the operation of an actuating gear 413. To this end, gear teeth 411a engaged with the actuating gear 413 is formed on the inside of the extendable/retractable member 411.

The actuating gear 413 is a configuration for extending and retracting the extendable/retractable member 411 with respect to the outlet 23. As the actuating gear 413 is rotated in engagement with the gear teeth 411a, the extendable/retractable member 411 is moved. The actuating gear 413 adjusts the degree of extension of the extendable/retractable member 411 to adjust the degree to which air discharged through the outlet 23 is circulated along the air circulation part 4, so that the degree of air circulation is adjusted according to the temperature of the inlet 21 to supply air having an optimal temperature to the stack 1.

The circulation duct 43 is a configuration connected to the inlet duct 41 to circulate air introduced through the inlet duct 41 toward the inlet 21, and has opposite ends connected to the inlet duct 41 and the outlet duct 45, respectively. The circulation duct 43 is fixedly formed to be in close contact with each of the opposite sides of the housing 2, so that high-temperature air passing through the circulation duct 43 has an insulating effect on opposite ends of the stack 1 to maintain a uniform temperature of the entire stack 1 even when the outside air temperature is low.

The outlet duct 45 is a configuration for discharging air circulated through the inlet duct 41 and the circulation duct 43 toward the inlet 21 of the housing 2 to be supplied back to the stack 1, and is formed on the inlet 21 to be connected to the respective circulation ducts 43. As illustrated in FIG. 7, the outlet duct 45 has a plurality of discharge holes 451 to discharge air circulated toward the inlet 21. The plurality of discharge holes 451 are formed at each longitudinal side of the outlet duct 45 at regular intervals to uniformly supply circulating air therethrough throughout the stack 1, so that cooling air having a uniform temperature is supplied throughout the stack 1. In addition, as illustrated in FIG. 8, the outlet duct 45 may be provided in various numbers, and may be formed in various numbers and sizes according to the length, area, and the like of the stack 1.

The temperature sensing part 5 is a configuration for measuring the temperature in the fuel cell, and includes an inlet sensor 51 for measuring the temperature at the inlet 21 of the housing 2 and an outlet sensor 53 measuring the temperature at the outlet 23 of the housing 2.

The inlet sensor 51 measures the temperature of air supplied to the stack 1 through the inlet 21, and adjusts the degree to which the extendable/retractable member 411 is extended toward the outlet 23 according to the measured temperature.

The outlet sensor 53 may measure the temperature of air discharged from the stack 1 through the outlet 23, and adjusts the operation of the blowing fan 3 according to the measured temperature.

The control part 6 is a configuration for controlling the operation of the fuel cell, and includes an operation control unit 61 for controlling an operation related to cooling of the fuel cell and an operation analysis unit 63 for optimizing the operation.

The operation control unit 61 is a configuration for controlling the operation related to cooling of the fuel cell, and adjusts the operation of the extendable/retractable member 411 according to the temperature of air supplied to the stack 1. When the temperature of air introduced into the stack 1 is lower than a set value, the operation control unit 61 allows the extendable/retractable member 411 to be extended toward the outlet 23 to circulate high-temperature air discharged through the outlet 23 toward the inlet 21 through the air circulation part 4, thereby increasing the temperature of air supplied to the stack 1. At this time, the operation control unit 61 controls the extendable/retractable member 411 so that the lower the temperature of introduced air is, the further the extendable/retractable member 411 is extended toward the outlet 23 to increase the degree of air circulation. In addition, the operation control unit 61 controls the operation of the blowing fan 3 by measuring the temperature of air discharged from the stack 1 while increasing the temperature of air introduced into the stack 1 through air circulation, and adjusts the degree of cooling through the control of the operation of the blowing fan 3 to maintain the inside of the stack 1 at an appropriate temperature. To this end, the operation control unit 61 includes an inlet temperature receiving module 611, an extension/retraction control module 612, an outlet temperature receiving module 613, and a blowing control module 614.

The inlet temperature receiving module 611 is a configuration for receiving temperature information of air introduced into the stack 1, and receives temperature information measured by the inlet sensor 51.

The extension/retraction control module 612 is a configuration for controlling the operation of the extendable/retractable member 411, and operates the actuating gear 413 to extend the extendable/retractable member 411 toward the outlet 23 when the temperature received by the inlet temperature receiving module 611 falls below a set value. At this time, the extension/retraction control module 612 adjusts the degree of extension of the extendable/retractable member 411 according to the temperature range of air at the inlet 21 so that the lower the temperature is, the further the extendable/retractable member 411 is extended and the more air is circulated, thereby increasing the temperature of air supplied to the stack 1. In particular, the degree of extension of the extendable/retractable member 411 adjusted by the extension/retraction control module 612 is analyzed by the operation analysis unit 63. The operation analysis unit 63 analyzes a correlation between the degree of extension of the extendable/retractable member 411 and the degree of change in the temperature at the inlet 21 to accurately adjust the temperature of air supplied to the stack 1.

The outlet temperature receiving module 613 is a configuration for receiving temperature information of air discharged from the stack 1, and receives temperature information measured by the outlet sensor 53.

The blowing control module 614 is a configuration for controlling the operation of the blowing fan 3, and adjusts the degree of operation of the blowing fan 3 according to the temperature information received by the outlet temperature receiving module 613. The blowing control module 614 adjusts the rotation speed of the blowing fan 3 so that the higher the temperature is, the faster the blowing fan 3 is rotated to increase the degree of cooling, thereby maintaining an appropriate temperature of air discharged from the stack 1.

The operation analysis unit 63 is a configuration for analyzing a change in the temperature at the inlet 21 according to the degree of extension of the extendable/retractable member 411, and collects information about the operation of the extendable/retractable member 411 and information about the temperature change to derive a correlation through big data analysis. In other words, the operation analysis unit 63 analyzes a correlation between the degree to which the extendable/retractable member 411 is extended toward the outlet 23 and the change in the temperature at the inlet 21 that changes according to the extension of the extendable/retractable member 411, and adjusts the degree of extension of the extendable/retractable member 411 so that the temperature at the inlet 21 is maintained in an appropriate range according to the analyzed correlation. Thus, the operation analysis unit 63 accurately adjusts the temperature of air supplied to the stack 1 through the inlet 21. To this end, the operation analysis unit 63 includes a temperature information collection module 631, an extension/retraction information collection module 632, a change rate calculation module 633, and a correlation analysis module 634.

The temperature information collection module 631 is a configuration for collecting the temperature information of air at the inlet 21, and receives and stores information measured by the inlet sensor 51 before and after the extendable/retractable member 411 is operated.

The extension/retraction information collection module 632 is a configuration for collecting information about the operation of the extendable/retractable member 411, and collects information about the degree to which the extendable/retractable 411 is extended toward the outlet 23. The extension/retraction information collection module 632 collects information about the degree of operation of the actuating gear 413, and collects information about rotation of the actuating gear 413 to determine the degree of extension of the extendable/retractable member 411.

The change rate calculation module 633 is a configuration for calculating the degree of change in the temperature at the inlet 21 before and after the extendable/retractable member 411 is operated, and calculates the rate of the temperature change from before the extendable/retractable member 411 is operated to after the extendable/retractable member 411 is operated and a predetermined time elapses.

The correlation analysis module 634 is a configuration for analyzing a correlation between the degree of extension of the extendable/retractable member 411 and the degree of change in the temperature at the inlet 21, and performs correlation analysis by a mechanical learning method using collected information. Therefore, the correlation analysis module 634 determines how much the temperature changes according to the degree of extension of the extendable/retractable member 411, and on the basis of this, the extension/retraction control module 612 adjusts the degree of extension of the extendable/retractable member 411 to achieve the appropriate temperature in consideration of the temperature at the inlet 21.

An air-cooling fuel cell capable of air recirculation according to another embodiment of the present disclosure will be described with reference to FIGS. 10 to 11. As illustrated in FIG. 10, the air-cooling type fuel cell is configured such that an outlet duct is formed at each of opposite sides of an inlet 21. As illustrated in FIG. 10, the number and the size of the outlet duct 45 may vary according to the size and area of a stack 1, the use environment, and the like. In particular, each of the respective outlet ducts 45 is connected to an air circulation part 4 provided at each of opposite sides of a housing 2, so that air introduced and circulated through an inlet duct 41 of each of the respective air circulation parts 4 is individually supplied through each of the outlet ducts 45. In this case, as illustrated in FIG. 11, a temperature sensing part 5 is provided at each of opposite sides of each of an inlet 21 and an outlet 23, an inlet sensor 51 is composed of a first inlet sensor 511 and a second inlet sensor 513, and an outlet sensor 53 is composed of a first outlet sensor 531 and a second outlet sensor 533.

Thus, an operation control part 61 adjusts the degree of each extendable/retractable member 411 according to the temperature at the inlet 21 measured by the first inlet sensor 511 and the second inlet sensor 513, thereby adjusting the degree of air circulation according to the temperature at each of the opposite sides of the inlet 21.

In addition, as illustrated in FIG. 11, the temperature at the side where fuel H such as hydrogen is introduced is formed lower than that at the side where the fuel H is discharged. In response to this, the temperature of air supplied to each of the opposite sides of the inlet 21 is set differently, so that the degree of extension of each extendable/retractable member 411 is adjusted according to the set temperature.

Thus, the operation control part 61 sets the temperature of air to be introduced into the inlet 21 according to the temperature of the outlet 23 measured by the first outlet sensor 531 and the second outlet sensor 533, and adjusts the degree of extension of each extendable/retractable member 411 according to the temperature measured by the first inlet sensor 511 and the second inlet sensor 513 in response to the set temperature of each of the opposite sides of the inlet 21. Thereby, the operation control part 61 uniformly adjusts the temperatures at opposite sides of the stack 1 to achieve optimal performance of the stack 1.

Although applicant has described applicant's preferred embodiments of this disclosure, it should be understood that these embodiments are not construed as limited to the disclosure and should be understood to include all changes, equivalents, and alternatives within the idea and the technical scope of the disclosure.

The invention claimed is:

1. An air-cooling type fuel cell comprising:
   a stack formed by stacking a plurality of unit cells;
   a housing accommodating and surrounding the stack therein;
   a blowing fan provided at a side of the housing and configured to circulate outside air to pass through the stack; and
   an air circulation part configured to recirculate air passing through the stack by the blowing fan toward an inlet of the stack; and
   an operation control part configured to control an operation of the fuel cell,
   wherein the air circulation part comprises:

an inlet duct provided at a position where an outlet of the housing that is configured to allow air passing through the stack to be discharged therethrough is provided, and configured to introduce a part of the discharged air;

a circulation duct configured to circulate the air introduced into the inlet duct toward an inlet of the housing that is configured to allow air to be introduced into the stack; and an outlet duct connected to the circulation duct, provided on the inlet, and configured to supply the air passing through the circulation duct to the stack, wherein the inlet duct comprises an extendable/retractable member protruding toward the outlet inside the inlet duct, and an actuating gear configured to extend and retract the extendable/retractable member, wherein the operation control part comprises an inlet temperature receiving module configured to receive temperature information about a temperature at the inlet of the housing, and an extension/retraction control module configured to adjust a degree of extension of the extendable/retractable member according to the temperature at the inlet.

2. The air-cooling type fuel cell of claim 1, further comprising an operation analysis part configured to analyze a correlation between the degree of extension of the extendable/retractable member and a change in the temperature at the inlet, wherein the operation analysis part comprises:
a temperature information collection module configured to collect the temperature information about the inlet;
an extension/retraction information collection module configured to collect information about an operation of the extendable/retractable member;
a change rate calculation module configured to calculate a degree of change in the temperature at the inlet before and after the extendable/retractable member is operated; and
a correlation analysis module configured to analyze a correlation between the degree of extension of the extendable/retractable member and the degree of change in the temperature, and the extension/retraction control module adjusts the degree of extension of the extendable/retractable member using the correlation analyzed by the correlation analysis module.

3. The air-cooling type fuel cell of claim 1, wherein the outlet duct is provided at each of opposite sides of the inlet,
the inlet duct is provided at each of opposite sides of the outlet so as to be connected to each of the respective outlet ducts, and
the operation control part measures a temperature at each of opposite sides of each of the inlet and the outlet to adjust the degree of extension of the extendable/retractable member of the inlet duct connected to each of the outlet ducts.

4. The air-cooling type fuel cell of claim 1, wherein the outlet duct comprises a plurality of discharge holes formed at regular intervals along a direction of the stack and configured to allow air to be supplied therethrough.

5. The air-cooling type fuel cell of claim 1, wherein the outlet duct comprises a plurality of outlet ducts provided according to a length and an area of the stack.

* * * * *